(12) United States Patent
Ford

(10) Patent No.: US 7,958,788 B2
(45) Date of Patent: Jun. 14, 2011

(54) PIEZOELECTRIC VIBRATING BEAM FORCE SENSOR

(75) Inventor: Michael William Ford, Sutton Coldfield (GB)

(73) Assignee: Illinois Tool Works Inc., Glenview, IL (US)

(*) Notice: Subject to any disclaimer, the term of this patent is extended or adjusted under 35 U.S.C. 154(b) by 507 days.

(21) Appl. No.: 12/064,680

(22) PCT Filed: Aug. 25, 2006

(86) PCT No.: PCT/GB2006/003174
§ 371 (c)(1),
(2), (4) Date: Jul. 2, 2008

(87) PCT Pub. No.: WO2007/023291
PCT Pub. Date: Mar. 1, 2007

(65) Prior Publication Data
US 2009/0133509 A1   May 28, 2009

(30) Foreign Application Priority Data

Aug. 25, 2005   (GB) ................................ 0517340.6

(51) Int. Cl.
*G01L 1/00* (2006.01)

(52) U.S. Cl. .................. 73/862.59; 73/579; 73/778

(58) Field of Classification Search ............... 73/862.59, 73/579, 778
See application file for complete search history.

(56) References Cited

U.S. PATENT DOCUMENTS

| 4,299,122 A | 11/1981 | Ueda et al. |
| 5,113,698 A | 5/1992 | Grlj et al. |
| 5,550,516 A * | 8/1996 | Burns et al. ............ 331/65 |

FOREIGN PATENT DOCUMENTS

| JP | 58 097610 | 6/1983 |
| WO | 2004/070335 | 8/2004 |

OTHER PUBLICATIONS

International Search Report issued regarding International Application No. PCT/GB2006/003174 (Nov. 2, 2006).
Written Opinion of the International Searching Authority issued regarding International Application No. PCT/GB2006/003174 (Nov. 2, 2006).

* cited by examiner

*Primary Examiner* — Hezron Williams
*Assistant Examiner* — Rose M Miller
(74) *Attorney, Agent, or Firm* — Thompson Hine LLP

(57) ABSTRACT

A force sensor (10) is forced from a vibrating beam (11), an excitation piezoelectric device (12) to cause a vibration in the beam at its resonate frequency and a measurement piezoelectric device (12) to measure the frequencies being indication of the force applied to the beam (11). The excitation and measurement piezoelectric devices (12) are attached to the beam adjacent to each other at one end of the beam (11).

8 Claims, 1 Drawing Sheet

PIEZOELECTRIC VIBRATING BEAM FORCE SENSOR

Figure 1:
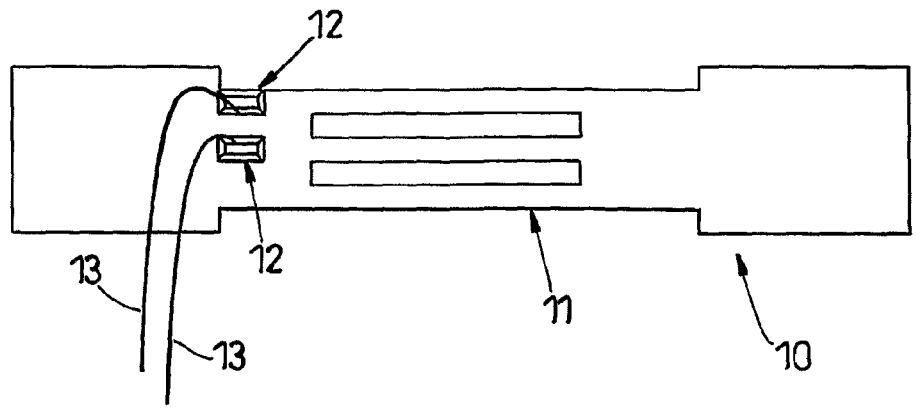

This invention relates to improvements in or relating to vibrating beam sensors.

Vibrating beam sensors are usually used to measure force. To do this, the beam is excited to vibrate at the mechanical resonant frequency of the beam. If there is change in tension in the beam due to the application of a force, the resonant frequency of the beam will change and this change can be measured and used to determine the size of the force applied. The mode of vibration usually used is the mode where a centre beam of the sensor vibrates in anti-phase to two outer beams perpendicular to the plane of the figure.

The excitation and detection of the beam has hitherto been carried out in many different ways such as, for example by electrostatic, optical, electromagnetic or piezoelectric arrangements. Very accurate sensors have been developed which use a beam made from a quartz material which is driven and detected by the inherent piezoelectric properties of the quartz material itself. Problems have arisen with the use of such arrangements because of the brittle nature of the quartz material which can lead to a mechanical failure of the beam and hence the sensor. As an alternative to such arrangements, a metallic beam has been utilised which has piezoelectric material bonded to its surface to excite and detect vibrations of the beam. However, it has not proven possible for sensors made in this way to operate sufficiently accurately enough for inclusion in devices in which a high degree of accuracy in measurement is required, for example in precision weighing machines.

Other problems also arise with existing arrangements due to one or more of the following:

a) The stressing of piezoelectric material bonded to the beam by the application of forces to the beam can cause instability in frequency readings from the beam with time.

b) Bonding of the piezoelectric material to both ends of the beam, one end being used to excite the beam and the other end being used to measure the extent of vibration. Such arrangements can suffer from unacceptable errors arising from the fact that providing the piezoelectric material at a position where there is a relative, high amplitude of vibration and tensile stress, can lead to the Q (Quality factor) of the vibration being reduced due to the combination of piezoelectric material bonding and conductor layers, usually used in conjunction with the piezoelectric material, having a lower Q than the beam alone. It will be appreciated that a high Q is required for accuracy of the sensor. Also one or more leads are required on each bonded piezoelectric device to connect the device to the drive or detect apparatus. Forces in these leads produce forces which act on an end of the beam and combine with the force on the beam to be measured to produce errors in the value of the force measured.

These arrangements therefore are prone to error at a level too great to be used in a precision weighing sensor.

It is the object of the present invention to overcome, or at least minimise, the above mentioned problems associated with known arrangements.

Thus, and in accordance with the present invention, therefore there is provided a force sensor comprising a beam, an excitation means operable to excite the beam to cause a vibration in the beam at its resonant frequency, a measurement means to measure the frequency of vibration of the beam, when a force is applied to the beam, the difference between the resonant frequency and the resonant frequency of the vibration measured when a force is applied to the sensor being indicative of the force applied, wherein said excitation means and said measurement means are attached to said beam towards one end thereof and are substantially adjacent each other.

With this arrangement it can be possible to avoid or at least minimise the problems associated with existing arrangements.

Preferably said excitation means and said measurement means comprise piezoelectric devices having appropriate properties. In a particularly preferred embodiment, the excitation means and the measurement means are bonded to the beam in a known manner. Alternatively one or both of the excitation means and/or the measurement means are attached to said beam by being printed thereon.

In some preferred embodiments, a single excitation means is provided and a pair of measurement means are provided. The pair of measurement means may be positioned such that they measure vibration signals substantially in anti-phase with each other. This can be achieved by providing one of the measurement means adjacent to a centre beam of the vibrating beam and the other measurement means adjacent to one of the outer beams wherein the vibrating beam is of the type comprising a centre beam and two outer beams.

Figure 2:
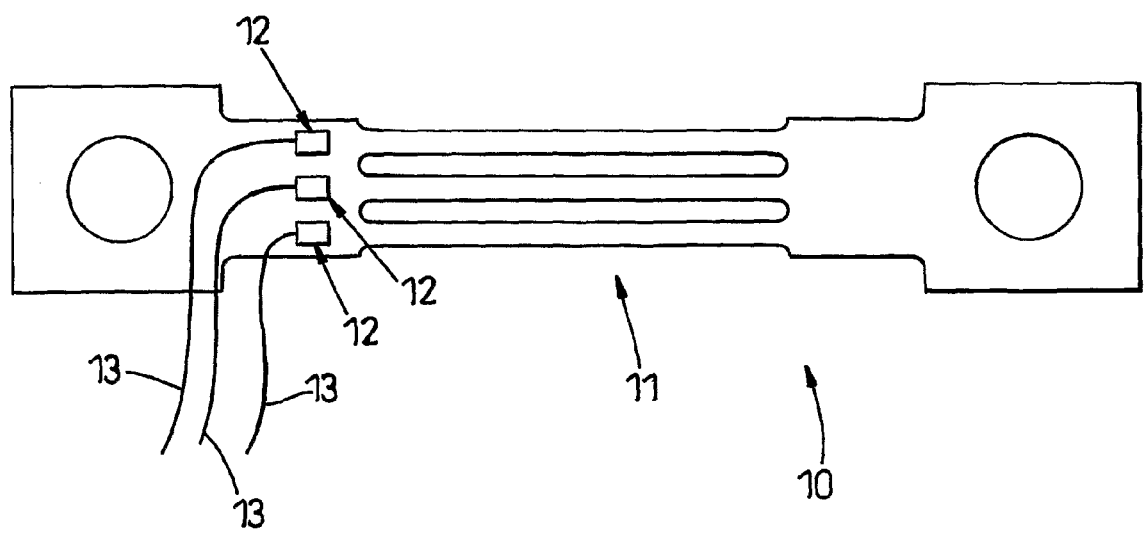

In order that the invention is more clearly understood, it is described further below, by way of example only, and with reference to the accompanying drawings in which FIG. 1 shows one embodiment of a force sensor in accordance with the present invention; and FIG. 2 shows an alternative embodiment of a force sensor in accordance with the present invention.

Referring first to FIG. 1, a force sensor 10 is provided in the form of vibrating beam 11. The vibrating beam 11 is provided in a form wherein there is a centre beam and two outer beams. Mounted towards one end of the beam 11 are a pair of piezoelectric devices 12 which are firmly bonded to the beam 11 in conventional manner. Electrical leads 13 are connected to each of the piezoelectric devices 12 and these connect the devices 12 to external processing and control apparatus (not shown).

Alternatively, a single piezoelectric device 12 can be utilised which carries two electrodes, or a single piezoelectric device 12 can be utilised which is capable of being switched between the driving frequency and a setting where the beams resonant frequency is detected.

In use, a first piezoelectric device 12 is excited by the external apparatus and causes the beam to vibrate at its resonant frequency. A second piezoelectric device 12 disposed substantially adjacent to the first piezoelectric device 12 detects the frequency of vibration of the beam 11.

When a force is applied to the beam 11, the resonant frequency of the beam changes and, this change, as mentioned above, is indicative of the force applied to the beam 11. The variation in frequency is processed by the external measurement and control apparatus, to which the electrical connections 13 are attached, and the detected force produced by for example, a weight, torque or pressure applied to the beam 11 can be displayed if required in any suitable manner.

It will be appreciated that the arrangement of the present invention allows the problems associated with known vibrating beam force sensors for this purpose to be overcome or at least minimised. In particular, the positioning of the piezoelectric devices 12 adjacent to each other, and at one end of the beam 11, means that these are at the edge of the stress field produced as the beam 11 vibrates. The stress produced by the vibration of the beam is much lower at this position than at the end of the beam 11. This leads to the measurement not being unduly influenced by deviations from the ideal properties of the beam 11 to any significant extent which leads to less errors. Furthermore, due to the positioning of the two piezoelectric devices 12, connections to the external control apparatus are close to each other and therefore less difficult to accommodate than the spaced apart devices of the prior art. The devices 12, in the present invention, and the connections attached to them, also have a much reduced effect on the measuring end of the beam 11 which leads to increased accuracy in measurement.

It will be appreciated that positioning the piezoelectric devices 12 close to each other and towards one end of the beam 11 is not something a skilled man would normally consider in a vibrating beam sensor, since this would mean that the devices 12 are outside the main stress field created by vibration of the beam. At this point, the signal produced with the piezoelectric device 12 or devices is less than a tenth of the signal produced when they are positioned at opposite ends of the beam 11. Positioning the piezoelectric device 12 in this position on the beam 11 also means that they are placed to detect and drive the mode where all three beams move together perpendicular to the plane of the figure. This gives a much larger signal than the desired mode and it is only with active electronic filtering that this mode can be rejected. Also, positioning the devices 12 in such a manner would result in the devices 12 effectively driving each other and detecting each other due to the small distance between them, and not the beam 11. In fact this does not happen since the Q (Quality factor) is higher in this arrangement than in a conventional arrangement.

Turning now to FIG. 2, an alternative embodiment of the present invention is shown. This second embodiment is like the first embodiment in all respects except that three piezoelectric devices 12 are provided rather than two piezoelectric devices 12. In the second embodiment, as in the first embodiment, one of the piezoelectric devices 12 is excited by the external apparatus and causes the beam to vibrate at its resonant frequency. The other two piezoelectric devices 12 disposed substantially adjacent to the first piezoelectric device 12 detect the frequency of vibration of the beam 11. Typically, one of the outer piezoelectric devices 12 is used to drive the beam 11 and the centre piezoelectric device 12 and the other outer piezoelectric device 12 are used for detecting the beam vibration.

The advantage of using the centre and one of the outer piezoelectric devices 12 to detect the beam frequency is that these signals will typically be in anti-phase, as the centre beam vibrates in anti-phase to the outer beams. This allows a differential measurement to be obtained, which provides a signal that is less susceptible to external influences. Additionally, the magnitude of the differential signal will be double that of the individual signal of each piezoelectric device 12. Measuring the differential signal also helps to ensuring the beam 11 is operating at it's correct fundamental frequency by suppressing unwanted frequency modes.

It will of course to be understood that the invention is not intended to be restricted to the details of the above embodiments which are described by way of example only.

The invention claimed is:

1. A force sensor comprising a beam, an excitation means operable to excite the beam to cause a vibration in the beam at its resonant frequency, a measurement means to measure the frequency of vibration of the beam, when a force is applied to the beam, the difference between the resonant frequency and the resonant frequency of the vibration measured when a force is applied to the sensor being indicative of the force applied, wherein said excitation means and said measurement means are attached to said beam towards one end thereof and are substantially adjacent each other and positioned at the edge of a stress field produced as the beam vibrates.

2. A force sensor according to claim 1 wherein, said measurement means and said excitation means comprise piezoelectric devices.

3. A force sensor according to claim 1 wherein, said excitation means and said measurement means are bonded to said beam.

4. A force sensor according to claim 1 wherein, one or both of the excitation means and the measurement means are printed onto the beam.

5. A force sensor according to claim 1 wherein, a single excitation means is provided and a pair of measurement means are provided.

6. A force sensor according to claim 5 wherein, the pair of measurement means are positioned such that they measure vibration signals substantially in anti-phase with each other.

7. A force sensor according to claim 2 wherein, said excitation means and said measurement means are bonded to said beam.

8. A force sensor according to claim 2 wherein, one or both of the excitation means and measurement means are printed onto the beam.

* * * * *